Patented Jan. 27, 1953

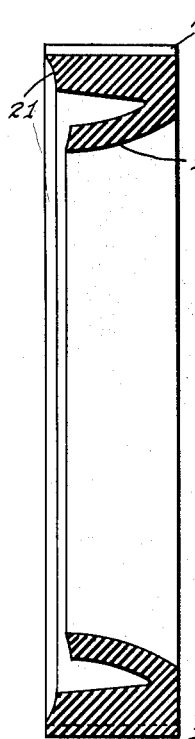
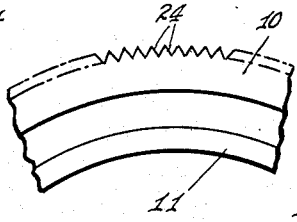
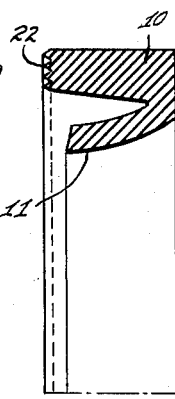
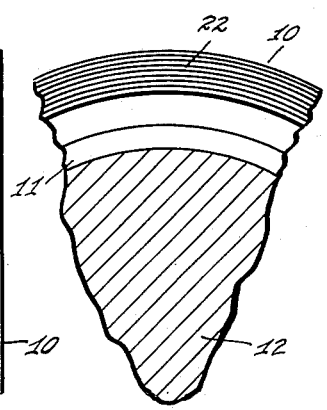
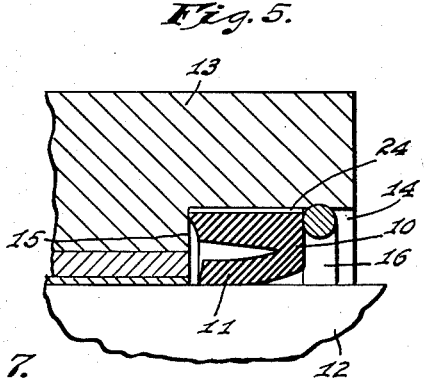
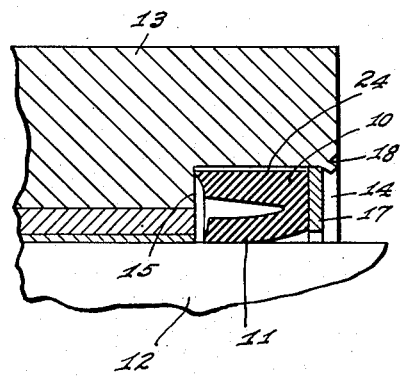
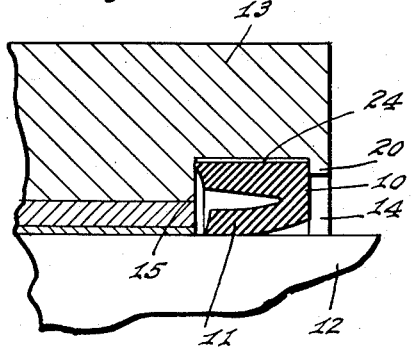

2,626,839

UNITED STATES PATENT OFFICE 2,626,839

BEARING SEAL

William K. Creson and Matthew W. Berghoff, Lafayette, Ind., assignors to Ross Gear & Tool Company, Lafayette, Ind., a corporation of Indiana Application June 23, 1945, Serial No. 601,150

2 Claims. (Cl. 308—36.1)

Our invention relates to sealing rings of the type employed to prevent the escape of lubricant from a shaft-bearing. It has heretofore been proposed to make such rings of resilient material such as rubber or a rubber-substitute and to provide them with an inwardly directed annular lip which bears resiliently against the shaft and which is so shaped that any pressure of lubricant within the bearing tends to force the lip against the shaft. To prevent the escape of lubricant over the outside of such a sealing ring, it has been customary to depend upon a relatively close fit between the outer cylindrical surface of the ring-body and a counter-bored portion of the bearing.

Sealing rings as above described have operated very satisfactorily to prevent the escape of lubricant along the surface of the shaft. However, in order to prevent escape of lubricant over the outside of the ring-body it is necessary to maintain rather close manufacturing tolerances in order to provide proper contact between the outer cylindrical surface of the ring body and the counter-bore in which it is customarily received. Injury to the surface of the counter-bore, or a counter-bore too large in diameter, may result in the escape of lubricant.

It is the object of our invention to provide a sealing ring which will be free from the objection just noted. More specifically, it is our object to provide a sealing ring which will be effective to prevent the escape of lubricant over its outer surface as well as along the shaft with which it co-operates. Still another object of our invention is to eliminate the necessity for close manufacturing tolerances.

In carrying out our invention, we employ a ring of resilient material provided interiorly with an integral flexible lip adapted to bear against a shaft or similar element. Instead of depending upon the fit between the outer cylindrical surface of the ring and the surface of the counter-bore in which it is received to prevent escape of lubricant over the outer surface of the ring, we depend upon the engagement of axially presented surfaces of the ring-body and counter-bore respectively. Desirably such engagement is between the inner end of the ring body and the bottom of the counter-bore.

The accompanying drawing illustrates our invention: Fig. 1 is an axial section through one form of sealing ring; Fig. 2 is a fragmental end elevation of the ring shown in Fig. 1; Fig. 3 is a view similar to Fig. 1 illustrating a modified construction; Fig. 4 is a fragmental end elevation of the ring shown in Fig. 3; and Figs. 5, 6, and 7 are fragmental axial sections illustrating various ways in which the sealing ring can be held in place in association with a bearing.

The ring shown in Fig. 1 comprises an annular body portion 10 from one end of which there extends a generally frusto-conical flange 11 disposed within the axial limits of the body 10. The body 10 and flange 11 are made integral with each other of some resilient material such as natural rubber or a synthetic rubber. The minimum normal diameter of the lip 11 will be somewhat less than the diameter of the shaft 12 with which it is to co-operate; and as a result, when the ring is in place the free edge of the lip will be stretched and will bear resiliently against the shaft. The ring is installed with the free edge of the flange 11 directed toward the interior of the bearing, as indicated in Figs. 5, 6, and 7, so that any fluid pressure existing within the bearings will be exerted on the outer face of the flange 11 and will force it against the shaft.

In mounting the ring in association with a bearing 13, the end of the bearing is counter-bored, as indicated at 14, and the bearing is provided with a retaining means which forces and holds the ring-body 10 against the bottom 15 of the counter-bore. In Fig. 5, such means takes the form of a split spring ring 16 which is seated in an annular groove in the wall of the counter-bore 14 and which bears against the outer end face of the ring-body. In Fig. 6, we provide a rigid ring 17 which fits within the counter-bore and which is held in place against the outer end face of the ring 10 by staking the bearing 13 at appropriate angular intervals as indicated at 18. In Fig. 7, the counter-bore is undercut to leave at its outer end an inwardly extending annular flange 20 which overlies the outer end face of the ring-body. In all constructions illustrated, the retaining means is so spaced from the bottom 15 of the counter-bore that the ring-body 10 will be axially compressed.

In order to insure circumferentially continuous contact between the bottom 15 of the counter-bore and the adjacent end face of the ring-body 10, such end face is relieved as by chamfering it in the manner indicated at 21 in Fig. 1 or by providing it with a plurality of annular, concentric grooves 22 as shown in Figs. 3 and 4. As a result of the chamfer 21 or the grooves 22 the ring body 10 when unstressed engages the bottom 15 of the counter-bore over a surface or surfaces which are of very small area so that when axial pressure is exerted on the ring-body by application of the retaining means, unit pressures between the bottom 15 of the counter-bore and the ring-body will be relatively high and circumferentially continuous contact of the ring-body with the counter-bore bottom 15 will result.

The construction described makes possible the use of wider manufacturing tolerances and coarser work than are possible when inter-engagement of cylindrical surfaces of the bearing and ring are relied upon to prevent the escape of lubricant over the ring. Because of the reduction in end-face area resulting from the chamfer 21 or the grooves 22, considerable variation may exist in the distance between the counter-bore-bottom 15 and the retainer, and effective sealing will still exist without the imposition of unduly large axial pressures on the ring body. The same is true if the counter-bore-bottom 15 is rough or non-planar. Since the sealing is effected at the end face of the ring-body, a close fit between the cylindrical surfaces between the ring body and counter-bore is not necessary. In fact, the outer cylindrical face of the ring-body may with advantage be provided with axial serrations 24 (Figs. 1 and 2), thus making it possible for the ring to be received in and held concentric with counter-bores of varying diameters without imposing on the ring-body proper radially directed compressive forces large enough to distort it.

We claim as our invention:

1. A sealing ring, comprising an annular body provided exteriorly with a plurality of closely-spaced, axially extending ribs and having at one end a frusto-conical flange which extends inwardly and toward the other end of the body, said body and flange being integral with each other and of resilient material, the end face of said body toward which said flange extends being relieved to leave a circumferentially continuous annular sealing surface materially narrower than the radial thickness of the ring body and lying in a plane normal to the ring-axis, said annular body for the major portion of its axial extent having a radial thickness great enough to permit a substantial compression of the material adjacent said annular surfaces without the production in the remainder of the body of stresses sufficient to create any material distortion thereof.

2. In combination, a bearing, a shaft supported in said bearing for movement relative thereto, said bearing being provided in one end with a counter-bore, a sealing ring comprising an annular body seated in said counter-bore and provided exteriorly with a plurality of closely-spaced, axially extending ribs resiliently engaging the wall of the counter-bore, said ring-body being provided at its outer end with a frusto-conical flange extending inwardly of the bearing and embracing said shaft, said body and flange being integral and of resilient material, the inner end face of the ring body being relieved to leave for engagement with the bottom of the counter-bore an annular sealing surface materially narrower than the radial thickness of the ring-body, and means forcing the relieved inner face of the ring-body against the counterbore-bottom to compress the material of the ring-body in the region adjacent each said annular surface, said annular body for the major portion of its axial extent having a radial thickness great enough to permit a substantial compression of the material adjacent said annular surfaces without the production in the remainder of the body of stresses sufficient to create any material distortion thereof.

WILLIAM K. CRESON.
MATTHEW W. BERGHOFF.

REFERENCES CITED

The following references are of record in the file of this patent:

UNITED STATES PATENTS

| Number | Name | Date |
| --- | --- | --- |
| 1,555,214 | Johnson | Sept. 29, 1925 |
| 1,972,809 | Watson et al. | Sept. 4, 1934 |
| 2,007,501 | Millmine | July 9, 1935 |
| 2,081,040 | King | May 18, 1937 |
| 2,188,857 | Chievitz | Jan. 30, 1940 |
| 2,212,291 | Heinze et al. | Aug. 20, 1940 |
| 2,394,800 | Murphy | Feb. 12, 1946 |

FOREIGN PATENTS

| Number | Country | Date |
| --- | --- | --- |
| 183,579 | Germany | of 1907 |
| 703,031 | Germany | of 1941 |